(12) United States Patent
Shi et al.

(10) Patent No.: US 10,884,489 B2
(45) Date of Patent: Jan. 5, 2021

(54) PROCESSING CIRCUIT OF DISPLAY PANEL, DISPLAY METHOD, AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Tiankuo Shi, Beijing (CN); Xue Dong, Beijing (CN); Dong Chen, Beijing (CN); Xiaomang Zhang, Beijing (CN); Wei Sun, Beijing (CN); Hao Zhang, Beijing (CN); Lingyun Shi, Beijing (CN); Xiaobo Xie, Beijing (CN); Zijiao Xue, Beijing (CN); Bo Gao, Beijing (CN); Yafei Li, Beijing (CN); Jinxing Liu, Beijing (CN); Yan Li, Beijing (CN); Yue Li, Beijing (CN); Xiangyi Chen, Beijing (CN); Shuaishuai Xu, Beijing (CN); Xiaochuan Chen, Beijing (CN); Shengji Yang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 15/753,455

(22) PCT Filed: Aug. 10, 2017

(86) PCT No.: PCT/CN2017/096774
§ 371 (c)(1),
(2) Date: Feb. 19, 2018

(87) PCT Pub. No.: WO2018/126686
PCT Pub. Date: Jul. 12, 2018

(65) Prior Publication Data
US 2020/0218340 A1 Jul. 9, 2020

(30) Foreign Application Priority Data

Jan. 3, 2017 (CN) .......................... 2017 1 0001943

(51) Int. Cl.
*G09G 5/00* (2006.01)
*G06F 3/01* (2006.01)
(Continued)

(52) U.S. Cl.
CPC .......... *G06F 3/013* (2013.01); *G06K 9/0061* (2013.01); *G06K 9/00268* (2013.01);
(Continued)

(58) Field of Classification Search
CPC .... G06F 3/013; G09G 3/3208; G09G 3/3413; G09G 3/36; G09G 2320/0261; G06K 9/00268; G06K 9/0061; G06T 3/4007
See application file for complete search history.

(56) References Cited

U.S. PATENT DOCUMENTS 4,513,317 A 4/1985 Ruoff, Jr.
10,387,782 B2* 8/2019 Kon .................. G06N 5/04
(Continued)

FOREIGN PATENT DOCUMENTS

CN 102547123 A 7/2012
CN 103207664 A 7/2013
(Continued)

OTHER PUBLICATIONS

International Search Report and Written Opinion for Application No. PCT/CN2017/096774, dated Oct. 26, 2017, 10 Pages.
(Continued)

*Primary Examiner* — Joe H Cheng
(74) *Attorney, Agent, or Firm* — Brooks Kushman P.C.

(57) ABSTRACT

The present disclosure provides a processing circuit of a display panel, a display method and a display device. The
(Continued)

processing circuit includes: a line-of-sight acquisition module configured to track an eyeball of each eye, to determine a concern region of line of sight on the display panel and a region other than the concern region; a control module configured to acquire original image data of an image to be displayed on the display panel, subject first original image data corresponding to the concern region and/or second original image data corresponding to the other region to treatment, and output first image generation data corresponding to the concern region and second image generation data corresponding to the other region and having a resolution smaller than the first image generation data; and a display signal output module configured to output a display signal to the display panel in accordance with the first image generation data and the second image generation data.

15 Claims, 3 Drawing Sheets

(51) Int. Cl.
  *G06K 9/00* (2006.01)
  *G06T 3/40* (2006.01)
  *G09G 3/34* (2006.01)
(52) U.S. Cl.
  CPC ......... *G06T 3/4007* (2013.01); *G09G 3/3413* (2013.01); *G09G 2320/0261* (2013.01)

(56) References Cited

U.S. PATENT DOCUMENTS

| | | | |
|---|---|---|---|
| 2002/0141614 | A1 | 10/2002 | Lin |
| 2005/0259035 | A1* | 11/2005 | Iwaki ...................... G06F 3/011 345/8 |
| 2012/0069243 | A1* | 3/2012 | Beemster ........... H04N 21/4122 348/521 |
| 2012/0154557 | A1* | 6/2012 | Perez ............... H04N 21/47205 348/53 |
| 2013/0106674 | A1* | 5/2013 | Wheeler ............ G02B 27/0176 345/8 |
| 2013/0335404 | A1* | 12/2013 | Westerinen ............. G06F 3/033 345/419 |
| 2014/0125558 | A1* | 5/2014 | Miyajima ................ G09B 7/02 345/8 |
| 2019/0361658 | A1* | 11/2019 | Shi ........................ G06F 3/0481 |

FOREIGN PATENT DOCUMENTS

| | | |
|---|---|---|
| CN | 103902978 A | 7/2014 |
| CN | 103974115 A | 8/2014 |
| CN | 106531073 A | 3/2017 |

OTHER PUBLICATIONS

First Office Action for Chinese Application No. 201710001943.X, dated Apr. 8, 2018, 7 Pages.

\* cited by examiner

501
tracking an eyeball of each eye to determine a concern region of line of sight on the display panel and a region other than the concern region 502
acquiring original image data of an image to be displayed on a display panel, subjecting first original image data corresponding to the concern region and/or second original image data corresponding to the other region to treatment, and outputting first image generation data corresponding to the concern region and second image generation data corresponding to the other region and having a resolution smaller than the first image generation data 503
outputting a display signal to the display panel in accordance with the first image generation data and the second image generation data

PROCESSING CIRCUIT OF DISPLAY PANEL, DISPLAY METHOD, AND DISPLAY DEVICE

CROSS-REFERENCE TO RELATED APPLICATIONS

This application is the U.S. national phase of PCT Application No. PCT/CN2017/096774 filed on Aug. 10, 2017, which claims priority to Chinese Patent Application No. 201710001943.X filed on Jan. 3, 2017, which are incorporated herein by reference in their entireties.

TECHNICAL FIELD

The present disclosure relates to the field of display technology, in particular to a processing circuit of a display panel, a display method, and a display device.

BACKGROUND

Along with the continuous development of the display technology, the definition of an image is highly demanded, so there has currently been a trend to provide a high resolution display device.

Usually, resolution refers to the number of pixels of the display device, e.g., in the case that the display device includes 1920*1080 pixels, its resolution is just 1920*1080. Points, lines and planes of the image each consists of the pixels, so the more the pixels, the finer the image, and the more the information displayed by the display device. Hence, a display effect of the image directly depends on a size of the resolution, which is one of the important indexes for the performance of the display device. However, in the case that the high resolution is provided, a large quantity of processing resources may inevitably be occupied and a data transmission volume may increase, and thereby the power consumption of the display device may increase significantly.

SUMMARY

In one aspect, the present disclosure provides in some embodiments a processing circuit of a display panel, including: a line-of-sight acquisition module configured to track an eyeball of each eye, to determine a concern region of line of sight on the display panel and a region other than the concern region; a control module configured to acquire original image data of an image to be displayed on the display panel, subject first original image data corresponding to the concern region and/or second original image data corresponding to the other region to treatment, and output first image generation data corresponding to the concern region and second image generation data corresponding to the other region and having a resolution smaller than the first image generation data; and a display signal output module configured to output a display signal to the display panel in accordance with the first image generation data and the second image generation data.

In a possible embodiment of the present disclosure, the line-of-sight acquisition module includes: a face identification unit configured to extract a face through a face detection algorithm, acquire a face region, and determine a deflection angle of the face; an eye identification unit configured to detect an eye feature at the face region, to acquire an eye region and determine a distance between the eye and the display panel; an offset calculation unit configured to determine a center of a pupil of each eye at the eye region, and calculate a movement amount of the center of the pupil of each eye; a direction vector calculation unit configured to calculate a direction vector of the line of sight of each eye in accordance with the movement amount of the center of the pupil of each eye and the deflection angle of the face; and a concern region determination unit configured to calculate the concern region of the line of sight and the region other than the concern region in accordance with the direction vector of the line of sight and space coordinates of each eye relative to the display panel.

In a possible embodiment of the present disclosure, the display panel includes subpixels arranged in a plurality of rows, the subpixels in two adjacent rows are arranged in such a staggered manner that a staggered distance between each two adjacent rows is equal to a half width of the subpixel, and each subpixel in one row is in a color different from two subpixels in the adjacent row closest to the subpixel. The control module includes: an original image data acquisition unit configured to acquire the original image data of the image to be displayed on the display panel, and determine the first original image data corresponding to the concern region and the second original image data corresponding to the other region; and a processing unit configured to, in the case that a resolution of the original image data is greater than a first threshold, subject the first original image data to BV3 algorithm treatment to acquire the first image generation data corresponding to the concern region and subject an image corresponding to the second original image data to reduction treatment to acquire the second image generation data corresponding to the other region, and in the case that the resolution of the original image data is smaller than a second threshold smaller than the first threshold, enlarge an image corresponding to the first original image data, subject the enlarged image to the BV3 algorithm treatment to acquire the first image generation data corresponding to the concern region, and directly output the second original image data as the second image generation data wherein the BV3 algorithm is an algorithm configured to performed weighted calculation on image data of original adjacent pixels to acquire image generation data having a resolution half of the original image data.

In a possible embodiment of the present disclosure, after the processing unit has subjected the image corresponding to the second original image data to the reduction treatment to acquire the second image generation data corresponding to the other region, the display signal output module is further configured to output to the display panel a display signal for displaying the second image generation data in a resolution-reduced, SmartView mode.

In another aspect, the present disclosure, the present disclosure provides in some embodiments a display device including a display panel and the above-mentioned processing circuit.

In a possible embodiment of the present disclosure, the control module is integrated into a Central Processing Unit (CPU) of the display device and the display signal output module is integrated into a driver Integrated Circuit (IC) of the display panel, or both the control module and the display signal output module are integrated into the driver IC of the display panel.

In a possible embodiment of the present disclosure, a base substrate of the display panel is a silicon substrate, and the driver IC of the display panel is integrated into the silicon substrate.

In a possible embodiment of the present disclosure, the display device is a head-mounted display device.

In yet another aspect, the present disclosure provides in some embodiments a display method for use in the abovementioned display panel, including steps of: tracking an eyeball of each eye to determine a concern region of line of sight on the display panel and a region other than the concern region; acquiring original image data of an image to be displayed on the display panel, subjecting first original image data corresponding to the concern region and/or second original image data corresponding to the other region to treatment, and outputting first image generation data corresponding to the concern region and second image generation data corresponding to the other region and having a resolution smaller than the first image generation data; and outputting a display signal to the display panel in accordance with the first image generation data and the second image generation data.

In a possible embodiment of the present disclosure, the step of tracking the eyeball of each eye to determine the concern region of the line of sight and the region other than the concern region includes: extracting a face through a face detection algorithm, acquiring a face region, and determining a deflection angle of the face; detecting an eye feature at the face region, to acquire an eye region and determine a distance between the eye and the display panel; determining a center of a pupil of each eye at the eye region, and calculating a movement amount of the center of the pupil of each eye; calculating a direction vector of the line of sight of each eye in accordance with the movement amount of the center of the pupil of each eye and the deflection angle of the face; and calculating the concern region of the line of sight and the region other than the concern region in accordance with the direction vector of the line of sight and space coordinates of each eye relative to the display panel.

In a possible embodiment of the present disclosure, the display panel includes subpixels arranged in a plurality of rows, the subpixels in two adjacent rows are arranged in such a staggered manner that a staggered distance between each two adjacent rows is equal to a half width of the subpixel, and each subpixel in one row is in a color different from two subpixels in the adjacent row closest to the subpixel. The step of acquiring original image data of an image to be displayed on the display panel, subjecting first original image data corresponding to the concern region and/or second original image data corresponding to the other region to treatment, and outputting first image generation data corresponding to the concern region and second image generation data corresponding to the other region includes: acquiring the original image data of the image to be displayed on the display panel, and determining the first original image data corresponding to the concern region and the second original image data corresponding to the other region; in the case that a resolution of the original image data is greater than a first threshold, subjecting the first original image data to BV3 algorithm treatment to acquire the first image generation data corresponding to the concern region and subjecting an image corresponding to the second original image data to reduction treatment to acquire the second image generation data corresponding to the other region; and in the case that the resolution of the original image data is smaller than a second threshold smaller than the first threshold, enlarging an image corresponding to the first original image data, subjecting the enlarged image to the BV3 algorithm treatment to acquire the first image generation data corresponding to the concern region, and directly outputting the second original image data as the second image generation data.

In a possible embodiment of the present disclosure, subsequent to the step of subjecting the image corresponding to the second original image data to the reduction treatment to acquire the second image generation data corresponding to the other region, the step of outputting the display signal to the display panel in accordance with the first image generation data and the second image generation data includes displaying the second image generation data in a resolution-reduced, SmartView mode.

In a possible embodiment of the present disclosure, the step of displaying the second image generation data in the resolution-reduced, SmartView mode includes applying a voltage to gate lines connected to subpixels in two adjacent rows, subjecting every two adjacent subpixels in an identical color in the subpixels in the two adjacent rows to identical treatment, and enabling two adjacent subpixels in a vertical direction to emit light at an identical brightness value.

According to the embodiments of the present disclosure, through determining the concern region of the line of sight on the display panel, it is able to adjust the resolutions of the images at different regions, i.e., to enable the resolution of the image corresponding to the concern region to be greater than that of the image corresponding to the other region. As a result, it is able to reduce the data processing burden and the data transmission volume of the display device while ensuring the display quality and the user experience, thereby to reduce the power consumption of the display device and extend a battery life of the display device.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

The present disclosure provides in some embodiments a processing circuit of a display panel, a display method and a display device, to reduce the power consumption of the display device while ensuring the display quality, thereby to make a compromise between the display quality and power consumption.

Figure 1:
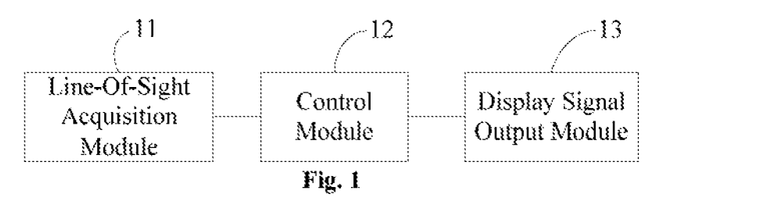
FIG. 1 is a schematic view showing a processing circuit of a display panel according to one embodiment of the present disclosure.

The present disclosure provides in some embodiments a processing circuit of a display panel which, as shown in FIG. 1, includes: a line-of-sight acquisition module 11 configured to track an eyeball of each eye, to determine a concern region of line of sight on the display panel and a region other than the concern region; a control module 12 configured to acquire original image data of an image to be displayed on the display panel, subject first original image data corresponding to the concern region and/or second original image data corresponding to the other region to treatment, and output first image generation data corresponding to the concern region and second image generation data corresponding to the other region and having a resolution smaller than the first image generation data; and a display signal output module 13 configured to output a display signal to the display panel in accordance with the first image generation data and the second image generation data.

Here, the line-of-sight acquisition module may be implemented by such hardware as an image acquisition device (e.g., a camera) and a relevant processing circuit (e.g., chip or CPU). The control module may be implemented by such hardware as a processing circuit (e.g., chip or CPU). The display signal output module may be implemented by a display device (e.g., a Liquid Crystal Display (LCD) or an Organic Light-Emitting Diode (OLED) display device).

According to the embodiments of the present disclosure, through determining the concern region of the line of sight on the display panel, it is able to adjust the resolutions of the images at different regions, i.e., to enable the resolution of the image corresponding to the concern region to be greater than that of the image corresponding to the other region. As a result, it is able to reduce the data processing burden and the data transmission volume of the display device while ensuring the display quality and the user experience, thereby to reduce the power consumption of the display device and extend a battery life of the display device.

Figure 2:
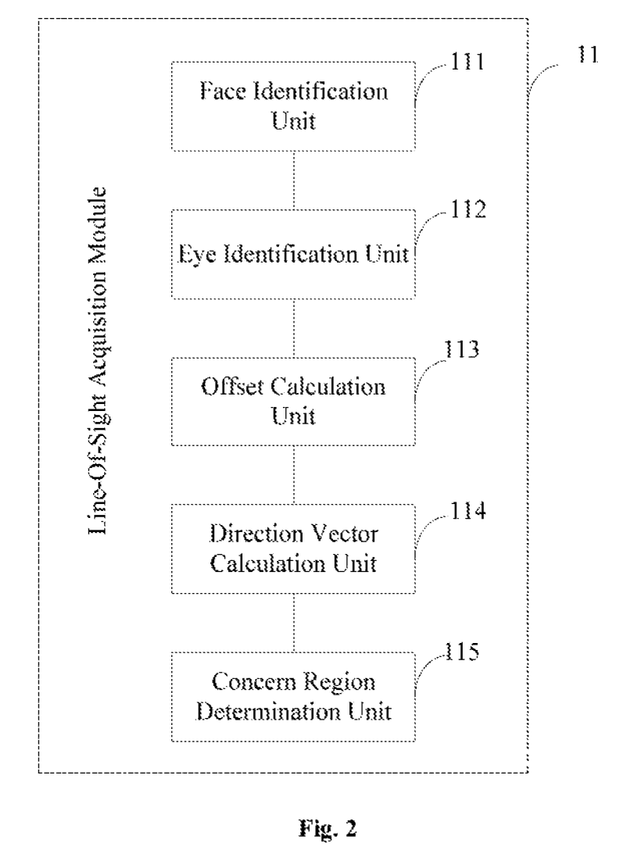
FIG. 2 is a schematic view showing a line-of-sight acquisition module according to one embodiment of the present disclosure.

In a possible embodiment of the present disclosure, as shown in FIG. 2, the line-of-sight acquisition module 11 includes a face identification unit 111, an eye identification unit 112, an offset calculation unit 113, a direction vector calculation unit 114 and a concern region determination unit 115.

The face identification unit 111 is configured to extract a face through a face detection algorithm, acquire a face region, and determine a deflection angle of the face. To be specific, information about a face image of a user may be acquired by an image sensor, and then the information about the face image may be processed by a processor, to acquire the face region in the image. Here, the methods for acquiring the face image and acquiring the face region from the face image are known in the art, and thus will not be particularly defined herein.

The eye identification unit 112 is configured to detect an eye feature at the face region, to acquire an eye region and determine a distance between the eye and the display panel. To be specific, upon the determination of the eye region, information about pupils of the eyes may be extracted, and then profile analysis may be performed on the information, to determine a center of the pupil of each eye. In addition, upon the determination of the eye region, space coordinates of each eye relative to the display panel may be calculated, and then the distance between each eye and the display panel may be calculated in accordance with the space coordinates of each eye relative to the display panel. Here, the detection of the eye feature at the face region, the acquisition of the eye region, the calculation of the space coordinates of each eye relative to the display panel, and the calculate of the distance between each eye and the display panel may be performed through a processor using known methods, which will not be particularly defined herein.

The offset calculation unit 113 is configured to determine the center of the pupil of each eye at the eye region, and calculate a movement amount of the center of the pupil of each eye.

The direction vector calculation unit 114 is configured to calculate a direction vector of the line of sight of each eye in accordance with the movement amount of the center of the pupil of each eye and the deflection angle of the face.

The concern region determination unit 115 is configured to calculate the concern region of the line of sight and the region other than the concern region in accordance with the direction vector of the line of sight and the space coordinates of each eye relative to the display panel.

The above description has been given so as to facilitate the understanding of an eye tracking mode, and it should be appreciated that, any other eye tracking mode may also be applicable, which will not be particularly defined herein. Here, the offset calculation unit 113, the direction vector calculation unit 114 and the concern region determination unit 115 may be implemented by such hardware as a processing circuit (e.g., chip or CPU), and they are merely used to perform simple spatial geometric operation, which will not be particularly defined herein.

Figure 3:
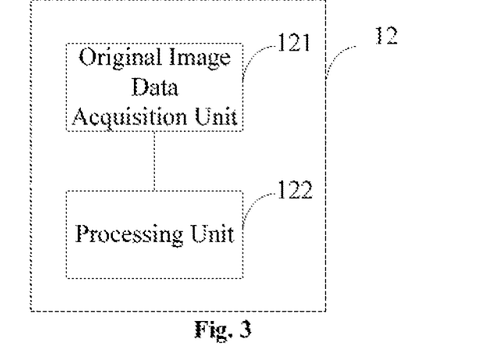
FIG. 3 is a schematic view showing a control module according to one embodiment of the present disclosure.

In a possible embodiment of the present disclosure, as shown in FIG. 3, the control module 12 includes: an original image data acquisition unit 121 configured to acquire the original image data of the image to be displayed on the display panel, and determine the first original image data corresponding to the concern region and the second original image data corresponding to the other region; and a processing unit 122 configured to, in the case that a resolution of the original image data is greater than a first threshold, subject the first original image data to BV3 algorithm treatment to acquire the first image generation data corresponding to the concern region and subject an image corresponding to the second original image data to reduction treatment to acquire the second image generation data corresponding to the other region, and in the case that the resolution of the original image data is smaller than a second threshold smaller than the first threshold, enlarge an image corresponding to the first original image data, subject the enlarged image to the BV3 algorithm treatment to acquire the first image generation data corresponding to the concern region, and directly output the second original image data as the second image generation data. Here, the first threshold and the second threshold may be set by the manufacturer when the product rolled off the factory floor, or set by the user manually. For example, each of the thresholds may be 800*600, 1600*900, or 1920*1080.

A BV3 algorithm is used to treat an image, whose original resolution is double the number of actual subpixels in a horizontal direction, in such a manner that the treated image is capable of being displayed on the display panel, to acquire an effect similar to the original high resolution based on the principle that the human eye is more sensitive to brightness, thereby to improve the resolution of the display image.

The BV3 algorithm will be described hereinafter.

In the case that a sequence of subpixels corresponding to an image having the original resolution is shown in the following table

| r1 | g1 | b1 | r2 | g2 | b2 | r3 | g3 | b3 | r4 | g4 | b4 |
|----|----|----|----|----|----|----|----|----|----|----|----|
| r5 | g5 | b5 | r6 | g6 | b6 | r6 | g7 | b7 | r7 | g8 | b8, | and a sequence of actual subpixels corresponding to an image to be displayed is shown in the following table

| R1 | G1 | B1 | R2 | G2 | B2 |
|----|----|----|----|----|----|
| R3 | G3 | B3 | R4 | G4 | B4 | corresponding conversion equations will be described as follows.

For the subpixels in odd-numbered rows, R1=∂r1+∂2r2, R2=∂r3+∂r4, . . . , where ∂1+∂2=1; G1=β1g1+β2g2, G2=β1g3+β2g4, . . . , where β1+β2=1; and B1=r1b1+r2b2, B2=r1b3+r2b4, . . . , where r1+r2=1. Coefficients ∂1, ∂2, β1, β2, r1 and r2 may be determined in accordance with the practical need, or in accordance with a debugging result. For example, each of them may be 0.5.

For the subpixels in even-numbered rows and at boundaries, R4=r8, and the red (R) subpixels at a right boundary may be treated in a similar way; G4=g8, and the green (G) subpixels at the right boundary may be treated in a similar way; and B3=b5, and the blue (B) subpixels at a left boundary may be treated in a similar way.

For the subpixels in the even-numbered rows and not at boundaries, R3=∂3r6+∂4r7, . . . , where ∂3+∂4=1; G3=β3g6+β4g7, . . . , where β3+β4=1; and B4=r3b7+r4b6, . . . , where r3+r4=1. The coefficients ∂1, ∂2, β1, β2, r1 and r2 may be determined in accordance with the practical need, or in accordance with a debugging result. For example, each of them may be 0.5.

As mentioned above, the conversion of the actual pixels are performed using the BV3 algorithm. In other words, the BV3 algorithm is used to performed weighted calculation on the image data of the original adjacent pixels, to acquire the image generation data having a resolution half of the original image data.

Figure 4:
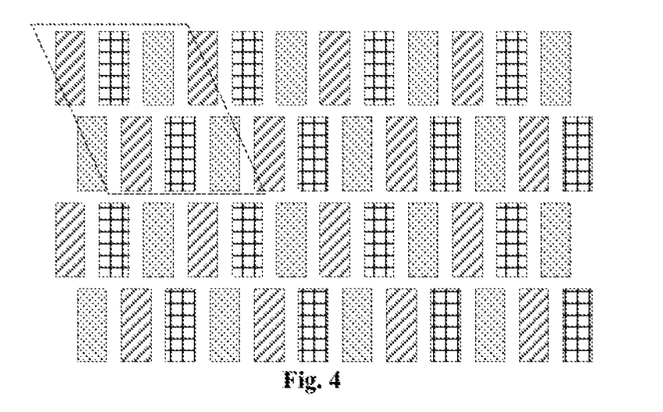
FIG. 4 is a schematic view showing an arrangement mode of subpixels of the display panel according to one embodiment of the present disclosure.

In a possible embodiment of the present disclosure, after the processing unit has subjected the image corresponding to the second original image data to the reduction treatment to acquire the second image generation data corresponding to the other region, the display signal output module is further configured to output to the display panel a display signal for displaying the second image generation data in a resolution-reduced, SmartView mode. As shown in FIG. 4, the display panel includes subpixels arranged in a plurality of rows, the subpixels in two adjacent rows are arranged in such a staggered manner that a staggered distance between each two adjacent rows is equal to a half width of the subpixel, and each subpixel in one row is in a color different from two subpixels in the adjacent row closest to the subpixel. In FIG. 4, for the SmartView mode (i.e., a resolution-reduced mode), two R subpixels in six subpixels within a dotted, diamond-shaped box may be subjected to the same treatment, two R subpixels in the six subpixels may be subjected to the same treatment, and two G subpixels in the six subpixels may be subjected to the same treatment. A voltage may be applied to gate lines connected to subpixels in two adjacent rows, and two adjacent subpixels in a vertical direction may emit light at an identical brightness value, to reduce the resolution of the display image. In FIG. 4, different patterns represent the subpixels in different colors, e.g., R subpixels, B subpixels and the G subpixels.

The present disclosure further provides in some embodiments a display device including a display panel and the above-mentioned processing circuit. The display device may be any product or member having a display function, such as a television, a display, a digital photo frame, a mobile phone or a flat-panel computer. The display device may further include a flexible circuit board, a printed circuit board and a back plate. The display panel may be an LCD panel or an OLED panel.

In a possible embodiment of the present disclosure, the control module is integrated into a CPU of the display device and the display signal output module is integrated into a driver IC of the display panel, or both the control module and the display signal output module are integrated into the driver IC of the display panel.

In a possible embodiment of the present disclosure, upon the acquisition of the line of sight, an image sensor may transmit information about the line of sight to the CPU of the display device. Next, the CPU of the display device may acquire the original image data of the image to be displayed on the display panel, subject the acquired original image data in accordance with the information about the line of sight to acquire the first image generation data and the second image generation data, and output the first image generation data and the second image generation data to the driver CI of the display panel, so that the driver IC of the display panel may display the image in accordance with the first image generation data and the second image generation data. The information about the line of sight may include information about the concern region of the line of sight and the region other than the concern region on the display panel.

In another possible embodiment of the present disclosure, upon the acquisition of the line of sight, the image sensor may transmit the information about the line of sight to the CPU of the display device. Next, the CPU of the display device may transmit the information about the line of sight to the driver IC of the display panel. Then, the driver IC of the display panel may acquire the original image data of the image to be displayed on the display panel, subject the acquired original image data to the treatment in accordance with the information about the line of sight to acquire the first image generation data and the second image generation data, and display the image in accordance with the first image generation data and the second image generation data. The information about the line of sight may include information about the concern region of the line of sight and the region other than the concern region on the display panel.

In a possible embodiment of the present disclosure, a base substrate of the display panel is a silicon substrate, and the driver IC of the display panel is integrated into the silicon substrate. Due to a very strong information storage capability of the silicon substrate, the driver IC of the display panel may be integrated into the silicon substrate, to simplify the structure of the display device.

In a possible embodiment of the present disclosure, the display device is a head-mounted display device. In the case that the head-mounted display device is used, through determining the concern region of the line of sight on the display panel, it is able to adjust the resolutions of the images at different regions, i.e., to output a high-resolution image at the concern region and output a low-resolution image at the other region. As a result, it is able to provide the images with different resolutions while meeting the requirements of the user, reduce the power consumption of the driver IC of the display pane, and reduce the data processing burden and the data transmission volume of the head-mounted display device, thereby to reduce the power consumption of the head-mounted display device and extend a battery life of the head-mounted display device.

Figure 5:
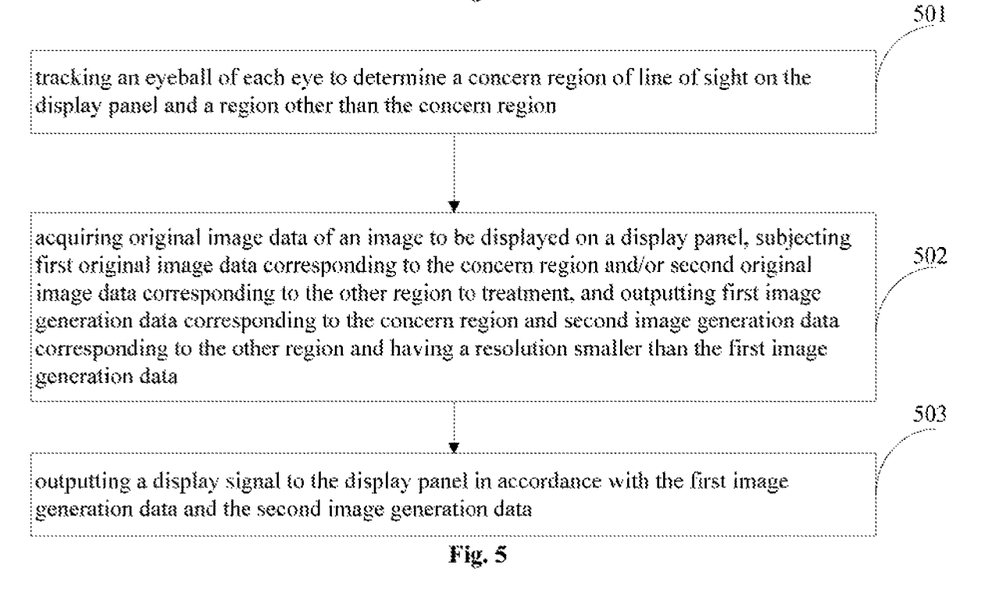
FIG. 5 is a flow chart of a display method according to one embodiment of the present disclosure.

The present disclosure further provides in some embodiments a display method for use in the above-mentioned display panel. As shown in FIG. 5, the display method includes: Step 501 of tracking an eyeball of each eye to determine a concern region of line of sight on the display panel and a region other than the concern region; Step 502 of acquiring original image data of an image to be displayed on the display panel, subjecting first original image data corresponding to the concern region and/or second original image data corresponding to the other region to treatment, and outputting first image generation data corresponding to the concern region and second image generation data corresponding to the other region and having a resolution smaller than the first image generation data; and Step 503 of outputting a display signal to the display panel in accordance with the first image generation data and the second image generation data to display the image.

According to the embodiments of the present disclosure, through determining the concern region of the line of sight on the display panel, it is able to adjust the resolutions of the images at different regions, i.e., to enable the resolution of the image corresponding to the concern region to be greater than that of the image corresponding to the other region. As a result, it is able to reduce the data processing burden and the data transmission volume of the display device while ensuring the display quality and the user experience, thereby to reduce the power consumption of the display device and extend a battery life of the display device.

Figure 6:
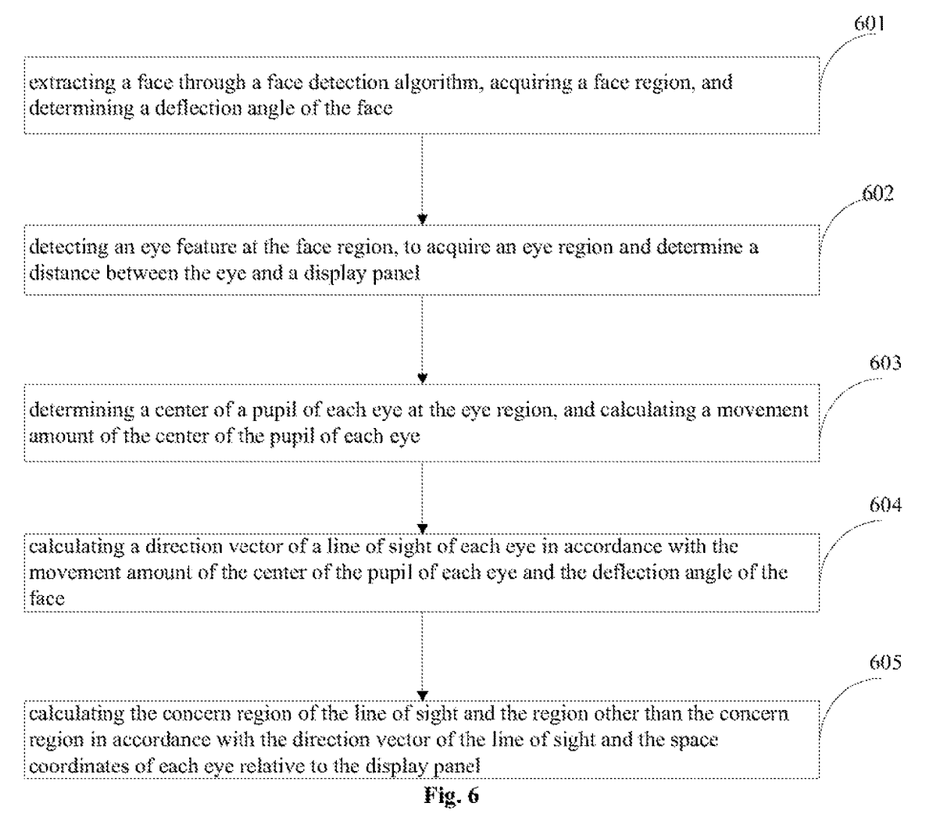
FIG. 6 is a flow chart of a step of tracking an eyeball of each eye to determine a concern region of line of sight on the display panel and a region other than the concern region according to one embodiment of the present disclosure.

In a possible embodiment of the present disclosure, as shown in FIG. 6, the step of tracking the eyeball of each eye to determine the concern region of the line of sight and the region other than the concern region includes the following Steps 601 to 605.

Step 601: extracting a face through a face detection algorithm, acquiring a face region, and determining a deflection angle of the face. Here, information about a face image of a user may be acquired by an image sensor Step 602: detecting an eye feature at the face region, to acquire an eye region and determine a distance between the eye and the display panel. To be specific, upon the determination of the eye region, information about pupils of the eyes may be extracted, and then profile analysis may be performed on the information, to determine a center of the pupil of each eye. In addition, upon the determination of the eye region, space coordinates of each eye relative to the display panel may be calculated, and then the distance between each eye and the display panel may be calculated in accordance with the space coordinates of each eye relative to the display panel.

Step 603: determining the center of the pupil of each eye at the eye region, and calculating a movement amount of the center of the pupil of each eye.

Step 604: calculating a direction vector of the line of sight of each eye in accordance with the movement amount of the center of the pupil of each eye and the deflection angle of the face.

Step 605: calculating the concern region of the line of sight and the region other than the concern region in accordance with the direction vector of the line of sight and the space coordinates of each eye relative to the display panel.

The above description has been given to facilitate the understanding of an eye tracking mode, and it should be appreciated that, any other eye tracking mode may also be applicable, which will not be particularly defined herein.

Figure 7:
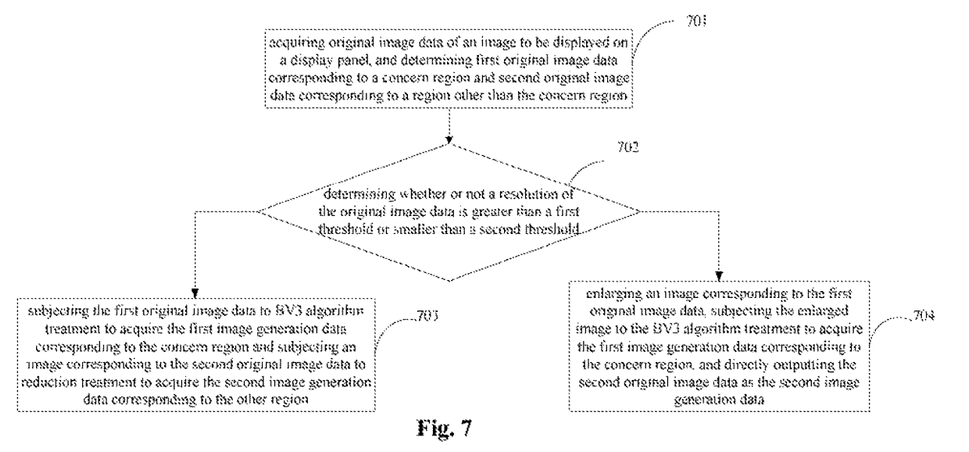
FIG. 7 is a flow chart of a step of outputting first image generation data corresponding to the concern region and second image generation data corresponding to the other region according to one embodiment of the present disclosure.

In a possible embodiment of the present disclosure, as shown in FIG. 7, the step of acquiring original image data of an image to be displayed on the display panel, subjecting first original image data corresponding to the concern region and/or second original image data corresponding to the other region to treatment, and outputting first image generation data corresponding to the concern region and second image generation data corresponding to the other region includes Steps 701 to 704.

Step 701: acquiring the original image data of the image to be displayed on the display panel, and determining the first original image data corresponding to the concern region and the second original image data corresponding to the other region.

Step 702: determining whether or not a resolution of the original image data is greater than a first threshold or smaller than a second threshold which is smaller than the firs threshold, in the case that the resolution of the original image data is greater than the first threshold, proceeding to Step 703, and in the case that the resolution of the original image data is smaller than the second threshold, proceeding to Step 704.

Step 703: subjecting the first original image data to BV3 algorithm treatment to acquire the first image generation data corresponding to the concern region and subjecting an image corresponding to the second original image data to reduction treatment to acquire the second image generation data corresponding to the other region.

Step 704: enlarging an image corresponding to the first original image data, subjecting the enlarged image to the BV3 algorithm treatment to acquire the first image generation data corresponding to the concern region, and directly outputting the second original image data as the second image generation data.

As shown in FIG. 4, the display panel includes subpixels arranged in a plurality of rows, the subpixels in two adjacent rows are arranged in such a staggered manner that a staggered distance between each two adjacent rows is equal to a half width of the subpixel, and each subpixel in one row is in a color different from two subpixels in the adjacent row closest to the subpixel. The BV3 algorithm is used to treat an image, whose original resolution is double the number of actual subpixels in a horizontal direction, in such a manner that the treated image is capable of being displayed on the display panel, to acquire an effect similar to the original high resolution based on the principle that the human eye is more sensitive to brightness, thereby to improve the resolution of the display image.

In a possible embodiment of the present disclosure, subsequent to the step of subjecting the image corresponding to the second original image data to the reduction treatment to acquire the second image generation data corresponding to the other region, the step of outputting the display signal to the display panel in accordance with the first image generation data and the second image generation data includes displaying the second image generation data in a resolution-reduced, SmartView mode. In FIG. 4, for the SmartView mode (i.e., a resolution-reduced mode), two R subpixels in six subpixels within a dotted, diamond-shaped box may be subjected to the same treatment, two R subpixels in the six subpixels may be subjected to the same treatment, and two G subpixels in the six subpixels may be subjected to the same treatment. A voltage may be applied to gate lines connected to subpixels in two adjacent rows, and two adjacent subpixels in a vertical direction may emit light at an identical brightness value, to reduce the resolution of the display image.

The functional members described in the specification are referred to as modules or units, to emphasize the independence of the implementation in a more particular manner.

According to the embodiments of the present disclosure, the modules/units may be implemented by software or circuits, so as to be executed by various processors. For example, an identified, executable code module may include one or more physical or logical blocks including computer instructions, and the module may be constructed as an image, a process or a function. Even so, the executable codes of the identified modules are unnecessary to be physically located together, but may include different instructions stored in different locations. In the case that these instructions are logically combined together, they form the modules and achieve the prescribed purposes of the modules.

Actually, the executable code module may be a single instruction or a plurality of instructions, and may even be distributed at different code segments, in different programs, or across a plurality of memory devices. Also, operational data may be identified in the modules, implemented in any appropriate form, and organized in any data structure of an appropriate type. The operational data may be collected as a single data set, or distributed at different locations (including different memory devices), and may be at least partially present in a system or network merely as an electronic signal.

In the case that the modules are implemented by software, considering the current hardware level, a person skilled in the art may build a corresponding hardware circuit to achieve the corresponding function in the case of taking no account of the cost. The hardware circuit includes a conventional very-large-scale integration (VLSI) circuit, a gate array, an existing semiconductor such as a logic chip and a transistor, or other discrete components. The modules may further be implemented by a programmable hardware device, such as a field-programmable gate array, a programmable array logic device and a programmable logic device.

In the embodiments of the present disclosure, the order of the steps is not limited to the serial numbers thereof. For a person skilled in the art, any change in the order of the steps shall also fall within the scope of the present disclosure if without any creative effort.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A processing circuit of a display panel, comprising:
   a line-of-sight acquisition module configured to track an eyeball of each eye, to determine a concern region of line of sight on the display panel and a region other than the concern region on the display panel;
   a control module configured to acquire original image data of an image to be displayed on the display panel, subject first original image data corresponding to the concern region and/or second original image data corresponding to the other region to treatment, and output first image generation data corresponding to the concern region and second image generation data corresponding to the other region and having a resolution smaller than the first image generation data; and
   a display signal output module configured to output a display signal to the display panel in accordance with the first image generation data and the second image generation data,
   wherein the control module comprises:
   an original image data acquisition unit configured to acquire the original image data of the image to be displayed on the display panel, and determine the first original image data corresponding to the concern region and the second original image data corresponding to the other region; and
   a processing unit configured to, in the case that a resolution of the original image data is greater than a first threshold, subject the first original image data to BV3 algorithm treatment to acquire the first image generation data corresponding to the concern region and subject an image corresponding to the second original image data to reduction treatment to acquire the second image generation data corresponding to the other region, and in the case that the resolution of the original image data is smaller than a second threshold smaller than the first threshold, enlarge an image corresponding to the first original image data, subject the enlarged image to the BV3 algorithm treatment to acquire the first image generation data corresponding to the concern region, and directly output the second original image data as the second image generation data,
   wherein the BV3 algorithm is an algorithm configured to performed weighted calculation on image data of original adjacent pixels to acquire image generation data having a resolution half of the original image data.

2. The processing circuit according to claim 1, wherein the line-of-sight acquisition module comprises:
   a face identification unit configured to extract a face through a face detection algorithm, acquire a face region, and determine a deflection angle of the face;
   an eye identification unit configured to detect an eye feature at the face region, to acquire an eye region and determine a distance between the eye and the display panel;
   an offset calculation unit configured to determine a center of a pupil of each eye at the eye region, and calculate a movement amount of the center of the pupil of each eye;
   a direction vector calculation unit configured to calculate a direction vector of the line of sight of each eye in accordance with the movement amount of the center of the pupil of each eye and the deflection angle of the face; and a concern region determination unit configured to calculate the concern region of the line of sight and the region other than the concern region in accordance with the direction vector of the line of sight and space coordinates of each eye relative to the display panel.

3. The processing circuit according to claim 1, wherein after the processing unit has subjected the image corresponding to the second original image data to the reduction treatment to acquire the second image generation data corresponding to the other region, the display signal output module is further configured to output to the display panel a display signal for displaying the second image generation data in a resolution-reduced mode.

4. A display device, comprising a display panel and the processing circuit according to claim 1.

5. The display device according to claim 4, wherein the control module is integrated into a Central Processing Unit (CPU) of the display device and the display signal output module is integrated into a driver Integrated Circuit (IC) of the display panel, or both the control module and the display signal output module are integrated into the driver IC of the display panel.

6. The display device according to claim 5, wherein a base substrate of the display panel is a silicon substrate, and the driver IC of the display panel is integrated into the silicon substrate.

7. The display device according to claim 6, wherein the display device is a head-mounted display device.

8. The display device according to claim 5, wherein the display device is a head-mounted display device.

9. The display device according to claim 4, wherein the display device is a head-mounted display device.

10. The display device according to claim 4, wherein the line-of-sight acquisition module comprises:
   a face identification unit configured to extract a face through a face detection algorithm, acquire a face region, and determine a deflection angle of the face;
   an eye identification unit configured to detect an eye feature at the face region, to acquire an eye region and determine a distance between the eye and the display panel;
   an offset calculation unit configured to determine a center of a pupil of each eye at the eye region, and calculate a movement amount of the center of the pupil of each eye;
   a direction vector calculation unit configured to calculate a direction vector of the line of sight of each eye in accordance with the movement amount of the center of the pupil of each eye and the deflection angle of the face; and
   a concern region determination unit configured to calculate the concern region of the line of sight and the region other than the concern region in accordance with the direction vector of the line of sight and space coordinates of each eye relative to the display panel.

11. A display method for use in the display panel according to claim 1, comprising steps of:
   tracking an eyeball of each eye to determine a concern region of line of sight on the display panel and a region other than the concern region;
   acquiring original image data of an image to be displayed on the display panel, subjecting first original image data corresponding to the concern region and/or second original image data corresponding to the other region to treatment, and outputting first image generation data corresponding to the concern region and second image generation data corresponding to the other region and having a resolution smaller than the first image generation data; and
   outputting a display signal to the display panel in accordance with the first image generation data and the second image generation data,
   wherein the display panel comprises subpixels arranged in a plurality of rows, the subpixels in two adjacent rows are arranged in such a staggered manner that a staggered distance between each two adjacent rows is equal to a half width of the subpixel, and each subpixel in one row is in a color different from two subpixels in the adjacent row closest to the subpixel,
   wherein the step of acquiring original image data of an image to be displayed on the display panel, subjecting first original image data corresponding to the concern region and/or second original image data corresponding to the other region to treatment, and outputting first image generation data corresponding to the concern region and second image generation data corresponding to the other region comprises:
   acquiring the original image data of the image to be displayed on the display panel, and determining the first original image data corresponding to the concern region and the second original image data corresponding to the other region;
   in the case that a resolution of the original image data is greater than a first threshold, subjecting the first original image data to BV3 algorithm treatment to acquire the first image generation data corresponding to the concern region and subjecting an image corresponding to the second original image data to reduction treatment to acquire the second image generation data corresponding to the other region; wherein the BV3 algorithm is an algorithm configured to performed weighted calculation on image data of original adjacent pixels to acquire image generation data having a resolution half of the original image data; and
   in the case that the resolution of the original image data is smaller than a second threshold smaller than the first threshold, enlarging an image corresponding to the first original image data, subjecting the enlarged image to the BV3 algorithm treatment to acquire the first image generation data corresponding to the concern region, and directly outputting the second original image data as the second image generation data.

12. The display method according to claim 11, wherein the step of tracking the eyeball of each eye to determine the concern region of the line of sight and the region other than the concern region comprises:
   extracting a face through a face detection algorithm, acquiring a face region, and determining a deflection angle of the face;
   detecting an eye feature at the face region, to acquire an eye region and determine a distance between the eye and the display panel;
   determining a center of a pupil of each eye at the eye region, and calculating a movement amount of the center of the pupil of each eye;
   calculating a direction vector of the line of sight of each eye in accordance with the movement amount of the center of the pupil of each eye and the deflection angle of the face; and
   calculating the concern region of the line of sight on the display panel and the region other than the concern region in accordance with the direction vector of the line of sight and space coordinates of each eye relative to the display panel.

13. The display method according to claim 11, wherein subsequent to the step of subjecting the image corresponding to the second original image data to the reduction treatment to acquire the second image generation data corresponding to the other region, the step of outputting the display signal to the display panel in accordance with the first image generation data and the second image generation data includes displaying the second image generation data in a resolution-reduced mode.

14. The display method according to claim 13, wherein the step of displaying the second image generation data in the resolution-reduced mode comprises applying a voltage to gate lines connected to subpixels in two adjacent rows, subjecting every two adjacent subpixels in an identical color in the subpixels in the two adjacent rows to identical treatment, and enabling two adjacent subpixels in a vertical direction to emit light at an identical brightness value.

15. A display device, comprising a display panel and a processing circuit, wherein the processing circuit of a display panel comprises:

a line-of-sight acquisition module configured to track an eyeball of each eye, to determine a concern region of line of sight on the display panel and a region other than the concern region on the display panel;

a control module configured to acquire original image data of an image to be displayed on the display panel, subject first original image data corresponding to the concern region and/or second original image data corresponding to the other region to treatment, and output first image generation data corresponding to the concern region and second image generation data corresponding to the other region and having a resolution smaller than the first image generation data; and a display signal output module configured to output a display signal to the display panel in accordance with the first image generation data and the second image generation data, wherein the control module is integrated into a Central Processing Unit (CPU) of the display device and the display signal output module is integrated into a driver Integrated Circuit (IC) of the display panel, or both the control module and the display signal output module are integrated into the driver IC of the display panel, wherein a base substrate of the display panel is a silicon substrate, and the driver IC of the display panel is integrated into the silicon substrate.

* * * * *